US005589028A

United States Patent [19]

Robinson et al.

[11] Patent Number: 5,589,028

[45] Date of Patent: Dec. 31, 1996

[54] BONDING METHOD EMPLOYING TIE LAYERS FOR ADHERING POLYETHYLENE TO FLUOROPOLYMERS

[75] Inventors: Donald N. Robinson, Collegeville; John H. Peltz, Glenolden, both of Pa.

[73] Assignee: Elf Atochem North America, Inc., Philadelphia, Pa.

[21] Appl. No.: 453,796

[22] Filed: May 30, 1995

Related U.S. Application Data

[62] Division of Ser. No. 334,184, Nov. 3, 1994, abandoned.

[51] Int. Cl.[6] ........ C09J 5/10

[52] U.S. Cl. ........ 156/306.6; 156/331.7; 428/421; 525/130

[58] Field of Search ........ 156/306.6, 331.7; 525/130; 428/421

[56] References Cited

U.S. PATENT DOCUMENTS

| | | | |
|---|---|---|---|
| 3,970,715 | 7/1976 | Jarrett | 525/130 |
| 4,221,757 | 9/1980 | Strassel . | |
| 4,291,099 | 9/1981 | Strassel . | |
| 4,410,595 | 10/1983 | Matsumoto et al. . | |
| 4,423,185 | 12/1983 | Matsumoto et al. | 525/130 |
| 4,946,535 | 8/1990 | Meckel et al. | 156/331.7 |
| 5,139,878 | 8/1992 | Kim et al. | 428/421 |

FOREIGN PATENT DOCUMENTS

| | | | |
|---|---|---|---|
| 0003449 | 8/1979 | European Pat. Off. . | |
| 58-147355 | 9/1983 | Japan | 428/421 |

*Primary Examiner*—John J. Gallagher
*Attorney, Agent, or Firm*—Ratner & Prestia

[57] ABSTRACT

A hot melt adhesive tie layer polymer blend for firmly adhering polyethylene to fluropolymers is disclosed.

5 Claims, No Drawings

BONDING METHOD EMPLOYING TIE LAYERS FOR ADHERING POLYETHYLENE TO FLUOROPOLYMERS

FIELD OF THE INVENTION

This application is a division of application Ser. No. 08/334,184, filed Nov. 3, 1994, now abandoned.

This invention relates to the art of adhering polyethylene to a fluoropolymer. More particularly, it relates to improved tie layers for adhering polyethylene to a fluoropolymer.

BACKGROUND OF THE INVENTION

Polyethylene (HDPE or LDPE) will not adhere to fluoropolymers, e.g. a VDF (vinylidene fluoride) homopolymer (PVDF) or a copolymer of VDF with hexafluoropropylene (HFP), without a tie layer.

Matsumoto et al. U.S. Pat. Nos. 4,410,595, issued Oct. 18, 1983, and 4,423,185, issued Dec. 27, 1983, disclose thermoplastic resinous compositions, sheets of which are useful for creating laminates with sheets of a wide variety of other materials, most of which are polymer resins.

More particularly, the thermoplastic resinous compositions of the above patents are taught to consist essentially of (a) 5 to 70% by weight of a thermoplastic polyurethane elastomer, and (b) 30 to 95% by weight of a modified polyolefin or olefin copolymer, having functional groups of at least one type selected from the group consisting of a carboxyl group, a carboxylate group, a carboxylic anhydride group, an amide group, a hydroxyl group and an epoxy group.

The other materials to which these compositions can be adhered in laminar form are taught to comprise at least one material selected from the group consisting of vinyl chloride polymer resins, thermoplastic polyester resins, ethylene/vinyl alcohol copolymer resins, polyamide resins, polyacrylonitrile and nitrile copolymer resins comprising at least 50% by weight of units derived from an unsaturated nitrile, polystyrene and styrene copolymer resins, polymethyl methacrylate and acrylic or methacrylic acid ester copolymer resins, polyurethane resins, olefin polymer resins, polyacetal resins, polyvinyl acetal resins, polycarbonate resins, polyphenylene oxide resins, polysulfone resins, epoxy resins, phenol-formaldehyde resins, unsaturated polyester resins, melamine-formaldehyde resins, urea-formaldehyde resins, synthetic rubbers, paper, wood and other cellulosic materials, cements, glass and other ceramic materials and metals.

These patents do not indicate that fluoropolymers can be laminated with the thermoplastic compositions of their invention. This is significant because the difficulty of bonding fluoropolymers to other surfaces is well known. Further, while these references teach that the backbone chains of their thermoplastic polymer resins, including polyurethanes, comprise ester linkages, they do not distinguish between aliphatic polyester-based polymers and non-aliphatic polyester-based polymers.

U.S. Pat. Nos. 4,221,757 and 4,291,099, issued to A. Strassel on Sep. 9, 1980 and Sep. 22, 1981, respectively, relate to laminates of polyvinylidene fluoride resin and a thermoplastic polyurethane, which laminates are formed without the use of any intermediate bonding agent. The bonding is preferably effected by coextrusion, which requires the polyvinylidene fluoride to have a specified apparent viscosity at 200° C., at specified velocity gradients. The polyvinylidene flouride resins may be homopolymers of vinylidene fluoride or copolymers containing at least 70% by weight of vinylidene fluoride.

The thermoplastic polyurethanes to which the polyvinylidene fluorides are laminated are disclosed to be linear or only slightly cross-linked polyurethanes obtained "by the known and conventional reaction of an organic diisocyanate with a diol, polyether and/or polyester having a molecular weight falling between 500 and 6000 . . . . " Useful diols, polyethers and polyesters for forming these polyurethanes are disclosed to include polyols, polyethers and polyesters copolymerized or grafted with acrylonitrile, acrylonitrile/styrene, methyl styrene, vinyl chloride, vinylidene chloride or methyl methacrylate. While other polymers may be blended with the polyurethane, these patents do not teach the use of an intermediate bonding layer between the polyvinylidene fluoride layer and the polyurethane layer, nor do they teach further laminating other materials to the polyurethane/polyvinylidene fluoride laminates.

SUMMARY OF THE INVENTION

This invention provides a thermoplastic, hot melt adhesive tie layer composition for adhering polyethylene to fluoropolymers. More particularly, the tie-layer composition of the present invention is a polymer blend consisting essentially of (a) 60–70% by weight of a thermoplastic aliphatic polyester-based polyurethane, (b) 20–35% by weight of an ethylene copolymer selected from (1) the copolymers of ethylene, vinyl acetate and maleic anhydride and (2) graft copolymers of polyethylene with maleic anhydride, and (c) 0–20% by weight of a homopolymer selected from (1) low density polyethylene (LDPE) having a density of 0.91 to 0.93 and (2) low molecular weight PVDF (polyvinylidene fluoride) homopolymer having a number average molecular weight in the range of 70,000 to 80,000 (or a weight average molecular weight in the range of 170,000 to 190,000).

The invention further provides a method for preparing a tie layer composition of the present invention as well as a method for adhering polyethylene to a fluoropolymer which comprises using a tie layer composition of the present invention under specified suitable conditions.

The tie layers of this invention are useful for preparing laminates of polyethylene with a fluoropolymer, e.g. by coextrusion, to prepare composite gasoline fuel hoses, gasoline tanks, soil barrier films and the like.

DETAILED DESCRIPTION OF THE INVENTION

The tie layer is a polymer blend consisting essentially of:

(a) an aliphatic thermoplastic polyester-based polyurethane having a melting point in the range of 75°–140° C. and a specific gravity on the order of 1.13 (e.g. "Morthane PN03214" from Morton Co.), 60%–70%, preferably 65%, by weight.

(b) a copolymer of ethylene, vinyl acetate, and maleic anhydride (e.g. Orevac 9307, Elf Atochem) or maleic anhydride-modified polyethylene (e.g. Orevac 18302, Elf Atochem), preferably Orevac 9307, 20–35%, preferably 25%, by weight; and (c) low density polyethylene (LDPE) (e.g. "Petrothene" from Quantum Co. having a density of 0.918, a Vicat softening point of 94° C. and a melting point of 110° C.), or low molecular weight PVDF (e.g. "Kynar 710"

from Kynar having a number average molecular weight ($M_n$) in the range of 70,000 to 80,000, a melting point of 168°- 170° C. and a density of 1.78) 0–20%, preferably 10%, by weight.

The polyethylene to be adhered using the composition and method of the invention may be either low density polyethylene, having a density in the range of from 0.91 to 0.93, preferably 0.92 to 0.93, or high density polyethylene having a density in the range of from 0.95 to 0.97. The fluoropolymer to be adhered to the polyethylene may be polyvinylidene fluoride (PVDF) e.g. Kynar 710 or a copolymer of vinylidene fluoride with another polymerizable fluoromonomer, e.g. hexafluoropropylene (for example, KYNAR 2850). The number average molecular weight ($M_n$) of the fluoropolymer should be in the range of from 70,000 to 120,000, preferably from 100,000 to 120,000. Preferably, the fluoropolymer is a copolymer.

The apparatus used for making the laminates of the present invention can be any conventional or standard extruder, dies or stream distributors generally employed for the coextrusion of thermoplastic polymers. The thickness of each of the polymer layers will depend on the regulation of the flow rate of each of the extruders. Generally, the die temperature should be between 180° C. and 230° C., with the temperatures of the extruders being those usually provided in the case of the single extrusion of each of the polymers.

It is possible to incorporate standard additives such as fillers, pigments, plasticizers, stabilizers, etc. in each of the extrudable polymers in their usual amounts and for their usual functions. The laminates of the invention can be extruded into any conventional form, including film, plate, tube or any other shape conventionally obtainable by coextrusion.

The adhesion of polyethylene to fluoropolymer is superior when using the tie layers of this invention, which contain an aliphatic polyester-based polyurethane component. This can be seen from Table 2, which compares the effect of using tie layer compositions of the present invention with the use of similar compositions outside the scope of the present invention in that, while they also contain polyurethane components, the polyurethane components of the comparative examples (Examples 10–13) are not aliphatic polyester-based. For the purposes of the adhesion test described, a peel strength of at least 8 pounds/inch is an indication of firm adhesion.

The tie layer blend can be made by melt mixing the component polymers at 125°–150° C. on a mill, in a Brabender melt mixer, or in a twin screw extruder. The blend can be compression-molded at 150°–177° C. to a sheet of 8–10 mils in thickness.

For laboratory scale composites, the tie layer sheet is placed between plaques of polyethylene and fluoropolymer; and the "sandwich" is placed in a hot press at 450°–475° F. (232°–246° C.) for 1–3 minutes at low pressure. Adhesion between layers is measured by peel strength, using the Instron tensile tester. Conveniently, the composite is one inch in width. As noted above, a reading of at least 8 pounds/inch indicates strong adhesion in this test.

For larger scale composites, coextrusion may be used. Coextruded tubing has been made, using three extruders and a crosshead die. Conventional extrusion methods, as outlined above and as described in further detail in U.S. Pat. No. 4,291,099, the contents of which are hereby incorporated herein by reference, may be employed.

The following is a summary of useful ranges for the tie layer composition and methods of the present invention:

Tie Layer Composition (by weight):

Aliphatic polyester-based polyurethane (e.g., Morthane PNO3214): 60–70%, preferably 65%;

Ethylene copolymer (either ethylene/vinyl acetate/maleic anhydride copolymer, e.g., Orevac 9307 or a graft copolymer of polyethylene and maleic anhydride, e.g., Orevac 18302): 20–35%, preferably 25%, preferably a maleic anhydride-grafted polyethylene;

Low density polyethylene (LDPE, e.g., Petrothene) or low molecular weight PVDF (e.g., Kynar K710): 0–20%, preferably LPDE, preferably 10%.

Tie Layer Blending Temperature:

125°–150° C. (257°–302° F.), preferably 125° C.

Composite Bonding Temperature:

232°–246° C., preferably about 245° C. (450°–475° F. preferably 475° F.).

Composite Bonding Time:

0.5–3 minutes, preferably 1 minute.

The following examples are presented to illustrate the practice of the invention, but are not intended to limit the scope thereof.

EXAMPLES 1–4

Examples 1–4, which illustrate several embodiments of the invention, are summarized in Table 1. In each example, the tie layer was prepared by melt-blending a 70 gram mixture of the components in a Brabender Plastograph at 125°–150° C., and then compression molding the blend at 150°–177° C. to an 8–10 mil sheet. The sheet was cut into 1×3.5 inch strips.

Plaques, 4 inches long by 4 inches wide and 30 mils thick, were compression-molded from polyethylene (Petrothene LDPE or Paxon HDPE) in a Carver press at 149° C. (300° F.) and cut to strips 1.5 inches in width. Fluoropolymer plaques, of vinylidene fluoride/hexafluoropropylene copolymer (KYNAR 2850) of similar size were molded at 232° C. (450° F.).

Composites were assembled as follows: Fluoropolymer/Tie Layer/Polyethylene. Each composite was pressed in a Carver Press at 475° F. for 1 minute at low pressure.

Peel strength was measured in pounds of force per inch of width, using the Instron tensile testing machine at a grip separation speed of 2 inches per minute.

TABLE 1

TIE LAYERS FOR POLYETHYLENE/ FLUOROPOLYMER ADHESION

| Example | Tie Layer (% by weight) | | Outer Layers | Peel Strength lbs/in. |
|---|---|---|---|---|
| 1 | MPN03214<br>O9307 | 65%<br>35% | K2850/<br>Petrothene LDPE | 10 |

TABLE 1-continued

TIE LAYERS FOR POLYETHYLENE/ FLUOROPOLYMER ADHESION

| Example | Tie Layer (% by weight) | | Outer Layers | Peel Strength lbs/in. |
|---|---|---|---|---|
| 2 | MPN03214 | 65% | (a)K2850/LDPE | 17 |
| | O18302 | 35% | (b)KYNAR 2850/ HDPE | 24 |
| 3 | MPN03214 | 65% | (a)K2850/LDPE | 12 |
| | O9307 | 25% | (b)K2850/ | 12 |
| | LDPE | 10% | HDPE | |
| 4 | MPN03214 | 65% | (a)K2850/LDPE | 18 |
| | O18302 | 25% | (b)K2850/ | 25.5 |
| | LDPE | 10% | HDPE | |

MPN = Morton aliphatic polyester-based polyurethane
09307 = Orevac 9307 = ethylene/vinyl acetate/maleic anhydride copolymer
018302 = Orevac 18302 = Maleic Anhydride-grafted polyethylene
LDPE = Low Density Polyethylene (Petrothene)
HDPE = High Density Polyethylene (Paxon)
K2580 = KYNAR FLEX VDF/HFP Copolymer

EXAMPLES 5–13

Examples 5–13, which illustrate the criticality of the polyurethane component of the tie layer of the present invention being alphatic polyester-based, are summarized in Table 2. In each example, the tie layer was prepared by melt-blending a 70 gram mixture of the components in a Brabender Plastograph at 125°–150° C., and then compression molding the blend at 150°–177° C. to an 8–10 mil sheet. The sheet was cut into 1 inch widths.

Sheets, 30 mils thick, were compression-molded from polyethylene (Petrothene LDPE or Gundle HDPE) in a Carver press at 149° C. (300° F.) and cut to strips 1.5 inches in width. Plaques of fluoropolymer (KYNAR 2850) of similar size were molded at 232° C. (450° F.).

Composites were assembled as follows: Fluoropolymer/ Tie Layer/Polyethylene. Each composite was pressed in a Carver Press at 475° F. for 1 minute at low pressure.

Peel strength was measured in pounds of force per inch of width, using the Instron tensile testing machine at a grip separation speed of 2 inches per minute.

TABLE 2

TIE LAYERS FOR POLYETHYLENE/ FLUOROPOLYMER ADHESION

| Example | Tie Layer (% by weight) | Outer Layers | Peel Strength lbs/in. |
|---|---|---|---|
| 5 | MPN03214/09307/LDPE (65/25/10) | (a)K2850/ LDPE | 12–16 |
| | MPN03214/09307/LDPE (65/25/10) | (b)K2850/ HDPE | 12 |
| 6 | MPN03214/018302/LDPE (65/25/10) | (a)K2850/ LDPE | 18 |
| | MPN03214/018302/LDPE (65/25/10) | (b)K2850/ HDPE | 25 |
| 7 | MPN03214/018302/K710 (65/25/10) | (a)K2850/ LDPE | 16 |
| | MPN03214/018302/K710 (65/25/10) | (b)K2850/ HDPE | 12 |
| 8 | MPN03214/09307 (65/35) | K2850/LDPE | 10 |
| 9 | MPN03214/018302 (65/35) | (a)K2850/ LDPE | 17 |
| | MPN03214/018302 (65/35) | (b)K2850/ HDPE | 24 |
| 10 | MCA100/018302/LDPE (65/25/10) | K2850/LDPE | 0 |
| 11 | MPS455204/09307 (65/35) | K2850/LDPE | slight |
| 12 | MPE192/09307 (65/35) | K2850/LDPE | 0 |
| 13 | MPC95/09307 (65/35) | K2850/LDPE | 0 |

MPN = Morton aliphatic polyester-based polyurethane
MCA = Morton aromatic polyester-based polyurethane
MPS = Morton aromatic polyester-based polyurethane
MPE = Morton polyether-based polyurethane
MPC = Morton polycaprolactone-based polyurethane
09307 = Orevac 9307 = ethylene/vinyl acetate/maleic anhydride copolymer
018302 = Orevac 18302 = Maleic Anhydride-grafted polyethylene
LDPE = Low Density Polyethylene (Petrothene)
HDPE = High Density Polyethylene (Paxon)
K710 = KYNAR PVDF Homopolymer
K2850 = KYNAR FLEX VDF/HFP Copolymer In Table 2, Examples 5–9 are illustrative of the use of tie layers of the present invention containing aliphatic based polyurethane whereas Examples 10–13 illustrate the use of tie layers wherein the polyurethane component is other than aliphatic polyester-based. As can be seen, the tie layers of Examples 5–9 provide surprisingly superior adhesion for the composites, as measured by peel strength, whereas comparative Examples 10–13, each of which differs from at least one of Examples 5–9 only in using a tie layer in which the polyurethane is not aliphatic polyester based, provide composites with very poor peel strength.

While the invention has been described herein with reference to specific embodiments, it is not limited thereto. Rather it should be recognized that this invention my be practiced as outline above within the spirit and scope of the appended claims, with such variants and modifications as may be made by those skilled in this art.

What is claimed is:

1. A method of laminating a sheet of polyethylene to a sheet of a fluoropolymer resin comprising the steps of:

blending a mixture consisting essentially of
- (a) 60–70% by weight of an aliphatic thermoplastic polyester-based polyurethane;
- (b) 20–35% by weight of a copolymer selected from
  - (1) the copolymers of ethylene, vinyl acetate and maleic anhydride and
  - (2) graft copolymers of polyethylene and maleic anhydride; and
- (c) 0–20% by weight of a homopolymer selected from low density polyethylene and low molecular weight polyvinylidene fluoride, at a temperature between 125°–150° C. to form a molten polymer mixture;

compression molding the molten mixture at a temperature between 150°–177° C. to form a tie layer sheet having a thickness of 8–10 mil;

disposing the tie layer sheet between a sheet of polyethylene; and a sheet of PVDF or PVDF-fluoromonomer copolymer to form a composite; and compression molding said composite at a temperature between 232° C. and 246° C. and under pressure sufficient to bond the sheet of polyethylene to the sheet of PVDF or PVDF-fluoromonomer copolymer.

2. A method according to claim 1 wherein said step of compression molding of said composite is effected by holding said composite under temperature and pressurize for between 0.5 and 3 minutes.

3. A method according to claim 2 wherein said composite is held under pressure and temperature for one minute.

4. A method according to claim 1 wherein said blending step is effected at a temperature of 125° C.

5. A method according to claim 1 wherein said step of compression molding said composite is effected at a temperature of 245° C.

* * * * *